United States Patent Office 3,357,181
Patented Dec. 12, 1967

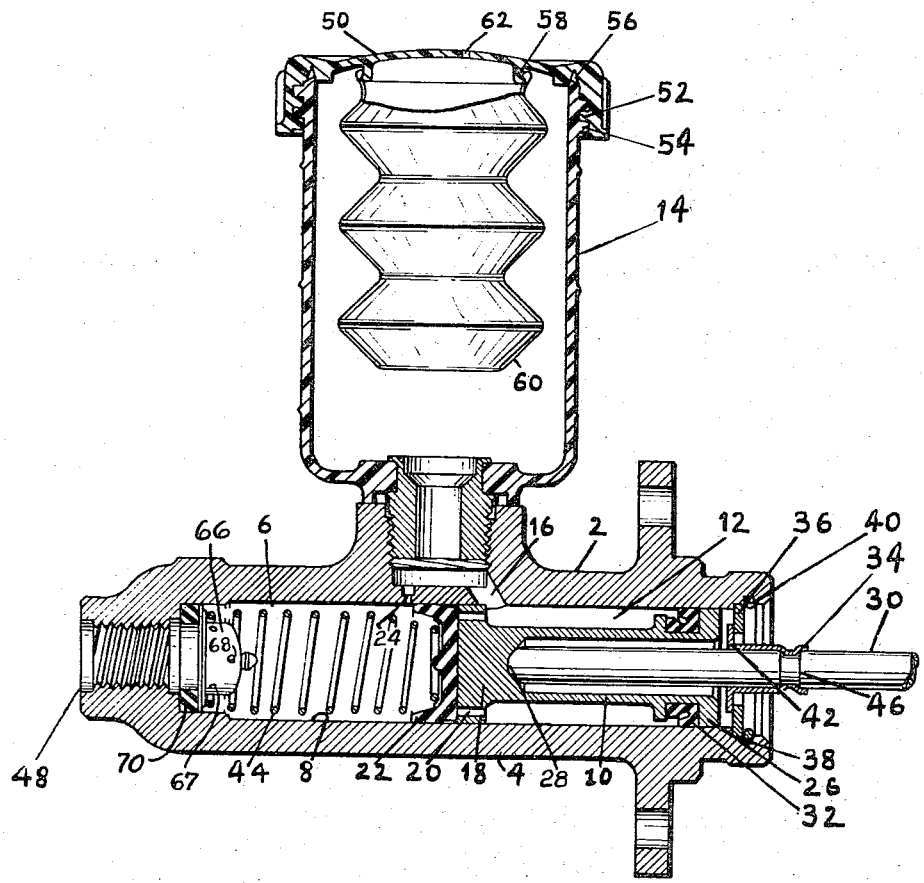

3,357,181
MASTER CYLINDER MORE PARTICULARLY FOR HYDRAULIC BRAKES
René Thirion, Paris, France, assignor to Societe Anonyme D.B.A., Paris, France, a company of France
Filed July 2, 1965, Ser. No. 469,127
Claims priority, application France, July 3, 1964, 980,667
4 Claims. (Cl. 60—54.6)

ABSTRACT OF THE DISCLOSURE

A master cylinder having a piston reciprocably mounted in a bore that is provided a sealing cup which controls a compensation port connecting a reservoir of the master cylinder with the working chamber provided ahead of the compensation port, said master cylinder reservoir being formed of plastic and mated with a self-sealing cover, and said piston being joined to a push rod by a means to permit the proper positioning of the piston within the bore to maintain it in a released attitude adjacent to and behind the compensation port.

SUMMARY

One object of the invention is to provide a master-cylinder construction enabling the mounting of the piston in a predetermined position with respect to the compensation port adapted to connect with the reservoir the working chamber located ahead of the said piston.

Another object of the invention is to provide a master-cylinder in which the piston is interlocked with the pedal-operated push rod to confer to said piston a predetermined position with respect to the compensation port.

Still another object of the invention is to provide a master-cylinder in which the release position of the piston is determined by adjusting means locked in a position in which the cup associated with the master-piston uncovers the compensation port connecting the reservoir with the working chamber located ahead of said piston.

A further object of the invention is to provide a plastic reservoir equipped with a cover shaped to seal itself with the outer edge of said reservoir without necessity of a packing ring, and to provide the cover with a vent port opening into a bellows mounted to an annular shoulder formed on the inner face of said cover.

The invention has as further object to provide a master-cylinder which during assembly can make use of leakage through the compensation port of compressed air injected into the working chamber of said cylinder to position the piston in the rest position thereof at a predetermined distance in front of said compensation port.

Other objects of the invention will appear from the following specification given with reference to the accompanying drawing showing in section an embodiment of a master-cylinder provided with a piston to which a predetermined release position is assigned with the cooperation of the pedal-operated push rod.

The master-cylinder indicated generally as at 2 comprises a housing 4 formed with a bore 6 acting as a working chamber 8 adapted to be pressurized by a piston 10. The latter is formed with an annular chamber 12 connected to a reservoir 14 by means of a supply passage 16. The piston has a head 18 formed with replenishing ports 20 controlled by a sealing cup 22 which, when the piston is in released position, uncovers a compensation port 24.

The piston has an annular rear portion 26, to provide a recess with a surface 28 abuttingly connected to a push rod 30 connected to the control pedal, not shown. The control pedal is biased by a pedal return spring, also not shown, to control the released attitude of the push rod 30. An annular guide cup 32 is mounted in a groove formed in the piston adjacent to the rear piston portion 26. To insure to the piston and to the sealing cup 22 a fixed position with respect to the compensation port 24 there is mounted, on the push rod, a flanged sleeve 34 which is crimped to said push rod 30 after an adjusting operation hereunder described. At the rear of the master-cylinder is secured a stop collar 36 held by means of a split ring 40 against a shoulder 38 formed in the master-cylinder housing 4, at the outer end of the cylinder bore.

In the release position, the flange 42 of the sleeve 34 takes support on the stop collar 36 under the action of the return spring 44 acting on the piston thus defining the piston release position, on the one hand, and the pedal release position, on the other hand.

During the assembly operation, the sleeve 34 is mounted freely onto the push rod 30 formed with an annular groove 46 located on the portion of the push rod which projects outwards from the master cylinder. When all the master-cylinder elements are being mounted in place, return spring 44 will maintain flange 42 of the sleeve 34 in engagement with the stop collar 36. The next step in the assembly is to push rod 30 inwardly—while the sleeve 34 is immobilized by a suitable tool—for a sufficient distance to be sure that the front lip of the cup 22 has passed over the compensation port, whereby the working chamber 8 is shut off from the reservoir. The size conferred to the piston length and the manufactuing tolerances are such that a clearance is then provided between the piston end portion 26 and the stop collar 36. Pressurized fluid, for example compressed air, is then introduced through the master cylinder discharge port 48, and the piston 10 and the push rod 30 are pushed backwards either manually or under the action of the compressed air, with the assistance of the return spring 44 till the apparition of the leakage. From this position, a predetermined backward movement is effected to uncover the compensation port while maintaining a short fixed distance between the front edge of the cup 22 and the compensation port 24. The sleeve 34 is then crimped in order to set a portion thereof into the annular groove formed on the push rod, whereby the push rod and the sleeve get locked one to another, thus conferring a fixed position to the movable unit formed by the cup 22, the piston 10, the push rod 30 and the pedal. This construction enables the suppression of lost motion between the pedal and the piston, and an immediate pressurization of the working chamber, thus compressing the detrimental cumulative effect of the manufacturing tolerances. The clearance provided between the piston end portion and the stop collar 36 enables a tilting of the sleeve flange 42 during actuation of the pedal in the space corresponding to said tolerances.

The reservoir 14 is made of a transparent or translucent plastic material and is secured in place to the cylinder housing so as to communicate with the supply passage 16.

The cover 50 of the reservoir is also made of a plastic material and is formed with a female threaded portion 52 which is engaged with a corresponding male portion on the outer end of the reservoir 14. This cover is constructed in a manner to insure itself the sealing of the reservoir without interposing any seat between the said elements. For this purpose, the cover is formed with a groove 56 which may have a triangular section wherein is engaged the outer edge of the reservoir when the cover is screwed and thus distorts the plastic material, either of the cover or of the reservoir or of both of them, whereby a suitable sealing effect is insured by the reservoir edge. The cover 50 is formed with an internal annular shoulder 58 onto which is assembled a bellows 60 formed with folds and adapted to follow the level of liquid in the reservoir.

The shoulder 58 and the bellows 60 define an enclosure communicating with the atmosphere by means of a vent port 62. Due to the fact that the bellows 60 is independent from the means insuring the sealing effect between the cover and the edge of the reservoir, this bellows may be formed as a thin wall structure and may be manufactured by plunging a mandrel having a shape corresponding to that of the bellows into a solution of a suitable elastomer. The end portion of the bellows 60 may be rolled to form a bead 64 which insures a yielding mounting of the bellows on the annular shoulder 58. Due to the fact that the bellows is formed as a thin wall structure, lengthening or shortening of said bellows, in response to the variations of the liquid level in the reservoir, do not correspond to a pressure variation in the latter.

It is to be noted that the double action valve 66 which equips the discharge port 48 has the feature consisting in the provision of one or several ports 67 arranged near the edge of the conventional metal cup forming part of said valve, these ports being arranged beyond the rubber cap 70 forming part of the valve and which acts as a poppet which controls the communication through the ports 68 provided near the head of the said cup. Due to this construction, a permanent communication is provided between the hydraulic circuit and the liquid reservoir, which prevents application against the disc of the friction pads of a disc brake actuated by the master-cylinder described above.

While one embodiment of the invention was described in the specification, numerous other embodiments will appear to those skilled in the art. The predetermined release piston position may also be applied to a master cylinder equipped either with a tilting valve or with a central supply provided by a two part piston.

What is claimed is:

1. A master cylinder adapted more particularly for control of hydraulic brake systems comprising a bore, a piston located in said bore, a sealing cup associated with the front portion of said piston, a working chamber located in said bore ahead of the piston, a reservoir, a passage which in the release position of the said piston connects the reservoir with the said working chamber, a recess in the piston, a push rod connected to the control pedal and adapted to engage the bottom of the said recess, a stop collar secured at the outer end of the cylinder bore, a sleeve mounted on the said push rod and projecting outside the cylinder bore in the piston release position, a flange on the sleeve having an outer diameter larger than that of the diameter of opening in said stop collar, an interlock between the said sleeve and the said push rod realized outside of the cylinder bore in a position in which, on the one hand, the sealing cup is located at a predetermined distance at the rear of the passage through which a communication is established between the reservoir and the working chamber in the piston release position and, on the other hand, the flange on the said sleeve takes abutment onto the said stop collar.

2. A master cylinder adapted more particularly for control of hydraulic brake systems comprising a bore, a piston located in said bore, a sealing cup associated with the front portion of said piston, a working chamber located in said bore ahead of the piston, a reservoir, a compensation port which in the piston release position provides a communication between said reservoir and said working chamber, a stop collar at the outer end of said bore, a push rod having a thrust connection with said piston, a sleeve freely mounted on the said push rod and extending outwardly from tthe cylinder bore in the piston release position, a substantially radially directed flange formed on thte inner end of said sleeve, an annular groove formed on the push rod in register with the outward portion of said sleeve, and crimpings set on said outward sleeve portion into said annular groove to interlock the push rod with the piston in such a location that in the piston release position the sealing cup is located at a predetermined distance at the rear of the compensation port and the sleeve flange takes abutment onto the stop collar.

3. A master cylinder according to claim 2 wherein the piston has such a length that in conjunction with the manufacturing tolerances there is provided a clearance between the sleeve flange and the rear face of said piston as well as around the push rod to enable an angular movement of said flange and of said push rod during the actuation of the master cylinder.

4. A master cylinder according to claim 2, including an annnular space in the piston connected to the reservoir by a supply passage and provided with an annular sealing cup applied against the piston rear portion located with a clearance with respect to the stop collar, the front portion of said piston being provided with replenishing ports controlled by the cup-shaped sealing cup urged by the return spring into engagement with the piston front portion.

References Cited
UNITED STATES PATENTS

| | | | |
|---|---|---|---|
| 2,997,026 | 8/1961 | Zimmerer | 92—128 |
| 3,065,734 | 11/1962 | Molzahn | 92—128 |
| 3,173,266 | 3/1965 | Shutt | 60—54.6 |
| 3,178,890 | 4/1965 | Wallace | 60—54.6 |
| 3,216,198 | 11/1965 | Brooks | 60—54.6 |

EDGAR W. GEOGHEGAN, *Primary Examiner.*

ROBERT R. BUNEVICH, *Examiner.*